United States Patent

[11] 3,608,748

[72] Inventor Paul R. Wilson
17830 Bahama St., North Ridge, Calif. 91324
[21] Appl. No. 880,050
[22] Filed Nov. 26, 1969
[45] Patented Sept. 28, 1971

[54] VEHICLE PARKING GARAGE
7 Claims, 7 Drawing Figs.
[52] U.S. Cl. ..................................................... 214/16.1 CC
[51] Int. Cl. ...................................................... B65g 1/06
[50] Field of Search ........................................... 214/16.1 CC

[56] References Cited
UNITED STATES PATENTS
1,643,409  12/1927  Freeman ........................ 214/16.1 CC
3,135,399  6/1964  de Saint-Andre ............. 214/16.1 CC Primary Examiner—Gerald M. Forlenza
Assistant Examiner—Raymond B. Johnson
Attorney—Roger A. Marrs ABSTRACT: A parking garage apparatus is disclosed herein for storing vehicles which provides a plurality of parallel longitudinal lanes or sections having a multiplicity of laterally movable pallets or carriers wherein each section is capable of storing parked vehicles on the respective carriers arranged in end-to-end relationship to form parking rows. A central travelling lane for vehicles to use during parking procedures is disposed between the adjacent parking sections and includes vertically movable platforms operable between a raised position and a lowered position, each platform serving as a coextensive surface with said carriers in its raised position, while in its lower position, permitting lateral movement of selected adjacent carriers thereover. Means are included for automatically conveying vehicles intended to be parked along the travelling lane and for selectively positioning the carriers and the platforms to permit unrestricted selection of parking location.

PATENTED SEP 28 1971
3,608,748
SHEET 1 OF 2
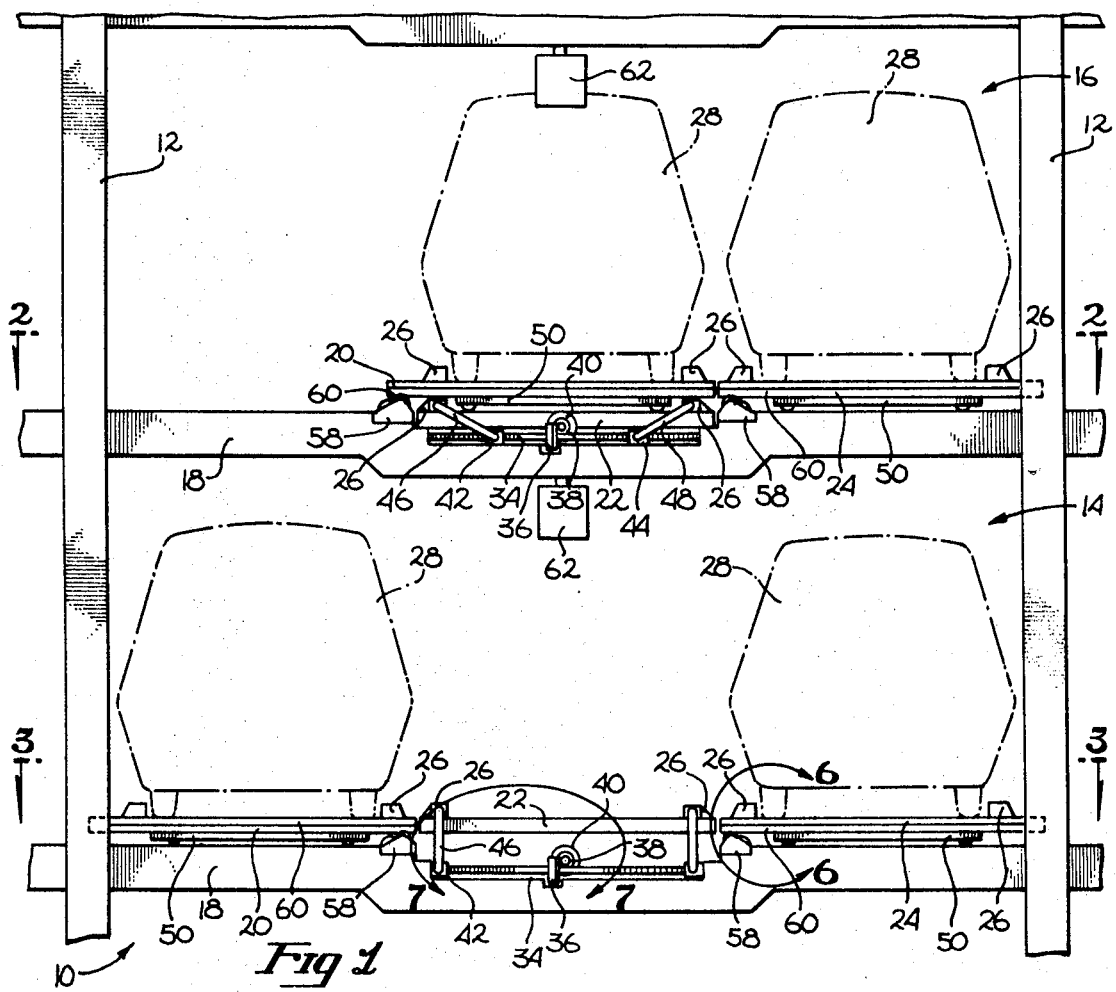
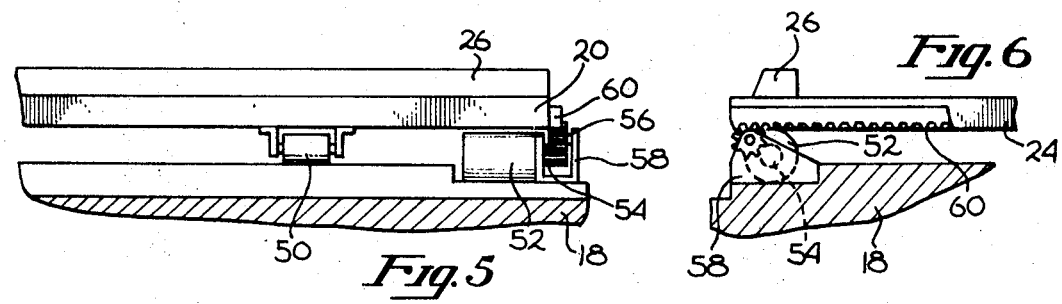
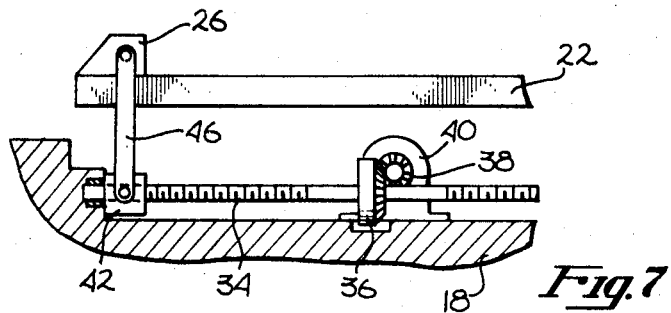
PAUL R. WILSON
INVENTOR.
BY Roger G. Morr

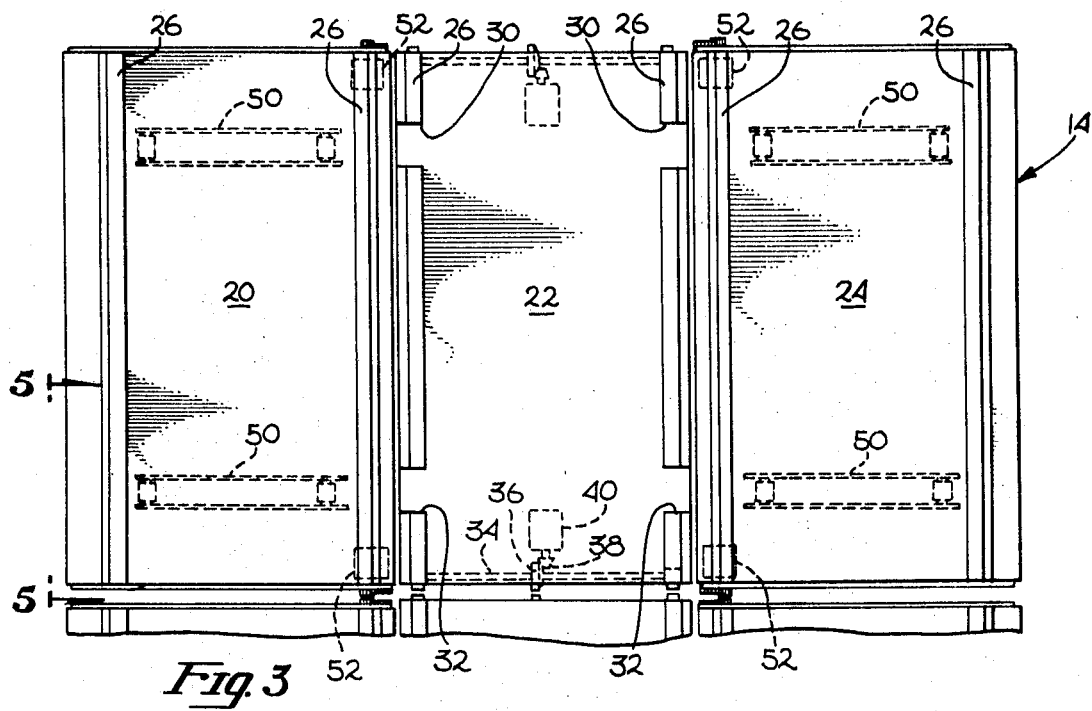
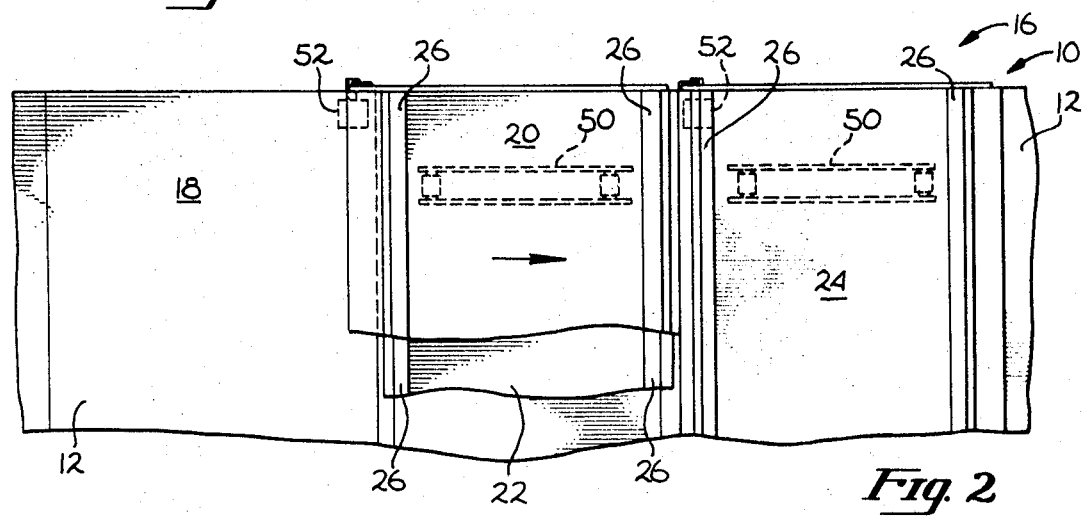
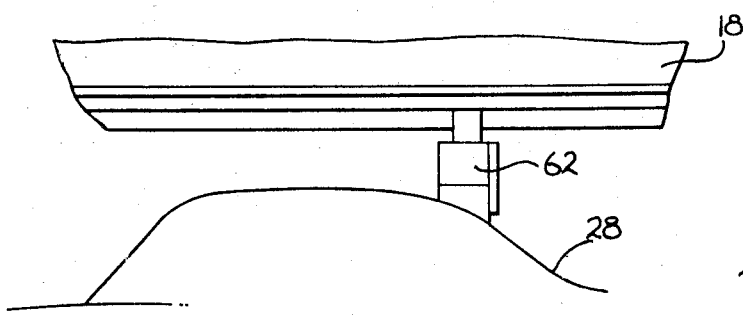
PAUL R. WILSON
INVENTOR.
BY Roger A. Marrs

3,608,748

VEHICLE PARKING GARAGE

BACKGROUND OF THE INVENTION

1. Field of the Invention

The field of this invention relates to automatic rapid transportation systems and, more particularly, to a parking garage apparatus for the vehicles employed in rapid transportation systems to eliminate loss of time in storing a vehicle and removing the particular stored vehicle while making effective use of the storing facility.

2. Description of the Prior Art

Mass transportation has become and will undoubtedly become more acute as one of the serious problems of society. Because of industrialization, people tend to combine together in one locale forming cities, towns and burroughs. Such grouping of communities has created a great problem in providing transportation for each person in his normal daily routine without a substantial waste of time. Specifically, during the early morning hours and the early evening hours when most people are commuting to and from their work, it is quite common for the commuting time to more than double.

Heretofore, there have been many attempts at designing mass transportation systems to operate efficiently during the peak hours. While there have been many group mass transportation systems considered and employed, such as trains, subways and buses, it appears that the "individual instinct" of each person will preclude their widespread use at present. Further, as society continues to become more affluent, it has been shown that one of man's first luxuries has been to depart from the masses and commute individually. Affluence, as well as population, tends to increase the number of automobiles on the highways which furthers congestion.

Heretofore, there have been attempts to design a vehicle which can be used individually with efficiency during periods of peak traffic flow. The most promising proposal appears to be individual vehicles which are small in size (compared to modern automobiles) facilitating maneuverability. Further, a substantially greater number of such small vehicles will occupy a given space of roadway than the modern large sized vehicles, thereby facilitating traffic flow. Specifically, it is envisioned that small electric cars or like vehicles will be generally employed in the not too distant future.

However, the use of smaller sized vehicles alone will not wholly solve the mass transportation problem. It is also required that the vehicles be stored when not in use. The storing of a large number of the vehicles must be accomplished efficiently and the removing of any one of the stored vehicles must also be accomplished in an efficient manner. Clearly, the use of a multiple level parking garage in some form must be available.

It would be desirable to design a parking garage for the use of smaller sized vehicles which is capable of efficiently storing a large number of vehicles and which is capable of removing from storage any individual vehicle. Such a garage must be built economically and require a minimum of maintenance. Also, automatic features are desirable which would permit remote and programmed handling of the vehicles according to time and sequence procedures.

SUMMARY OF THE INVENTION

The problems and difficulties encountered by the prior art are obviated by the present invention which provides a parking or garage apparatus having at least a pair of parallel parking lanes separated by a central travelling lane. The parking lanes include a plurality of laterally movable carriers arranged to move back and forth in transverse alignment between respective parking lanes and the travelling lane. The travelling lane includes a plurality of vertically positionable platforms adapted to provide a coextensive surface with the carriers when the platforms are raised. When the platforms are lowered, selected carriers may be transversely moved thereover. Means, such as an overhead continuous chain pusher, are provided directly above the center lane along its longitudinal length to provide driverless motive power to move the vehicles along the central travelling lane during parking procedures. Electrical switching devices are provided to operate the mechanical linkage to effect the above-mentioned carrier and platform movements. It is to be understood that the mechanisms and linkages for operating the carriers and platforms are timed so that no parking lane carrier is moving which could interfere with a vehicle moving upon the travel lane.

One of the primary objects of the apparatus of this invention is to provide a novel vehicular parking garage which facilitates the rapid and automatic storage and removal of vehicles according to a programmed sequence.

Another object of the parking garage apparatus of this invention is to provide a novel apparatus for selecting and removing a specific vehicle without requiring the change of position of any other vehicle.

Another object of the apparatus of this invention is to provide a novel vehicular storage apparatus employing pallets or carriers for movably supporting vehicles from one place to another during the parking procedure while under direction of preprogrammed control.

Another object of this invention is to provide a parking garage apparatus for selectively moving vehicles to and from parking locations via movable carriers and driverless pushing means.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a front view in the longitudinal direction of a portion of the first and second levels of a parking garage employing the apparatus of applicant's invention;

FIG. 2 is a top view of the apparatus of this invention taken along line 2—2 of FIG. 1 showing the first level of the garage during the initial phase of the parking procedure while a vehicle is being moved by the driverless means;

FIG. 3 is a top view taken along line 3—3 of FIG. 1 showing the vehicle previously located in the travel lane having been moved transversely to a parking lane via a movable carrier or pallet and which is replaced with a platform in its raised position;

FIG. 4 is a side view showing diagrammatically the relationship of the overhead continuous pusher to a vehicle for moving the vehicle along the central travel lane;

FIG. 5 is a side elevational view of the parking lane carrier and drive means therefor as taken along line 5—5 of FIG. 2;

FIG. 6 is an enlarged elevational view taken along line 6—6 of FIG. 1 showing in more detail the transverse driving means for a carrier associated with the second parking lane; and FIG. 7 is an enlarged elevational view taken along line 7—7 of FIG. 1 showing in more detail the structure to effect the vertical movement of a platform included in the center travel lane.

DESCRIPTION OF THE PREFERRED EMBODIMENT

Referring particularly to the drawings, there is shown a parking garage structure of apparatus 10 formed within a walled construction 12 and a floor structure 18. Apparatus 10 includes a plurality of identical levels or sections, located in longitudinal alignment, transverse alignment, and spaced overhead alignment. In FIG. 1, a lower level or section 14 and a spaced overhead level or section 16 is depicted for purposes of explanation.

Each of the levels or sections are to include a first longitudinally extending parking lane on the left hand side of the drawing, a center travel lane, a second parking lane on the right hand side of the drawing. Laterally movable carriers 20 and 24 movably support vehicles intended to be parked in the left- and right-hand lanes, respectively, as shown in level 14. The central lane includes a plurality of vertically movable platforms, such as indicated by numeral 22, adapted to be deposed between associated carriers 20 and 24 so as to provide a coextensive supporting surface for the vehicles during parking procedures.

Each of the carriers and platforms, which may be termed "pallets," are rectangular in configuration and in longitudinal length are slightly longer than vehicle 28. Each of the pallets 20, 22 and 24 include elongated guide blocks 26 which are spacedly mounted thereon slightly farther apart than the transverse wheel span of vehicle 28. Blocks 26 are to prevent the vehicle 28 from moving beyond the confines of its pallet in which it is located. Blocks 26 of the center travel pallet or platform 22 have transverse aligned gaps 30 and 32, as shown in FIG. 3, the function of which will be explained hereinafter. The vehicle 28 is depicted as small in physical size which is envisioned to be approximately the size of future electric vehicles. However, applicant does not desire to be restricted in the use of his invention to only the smaller sized vehicle. Although applicant believes his inventive apparatus would be most suited for such vehicles, it is intended that use of applicant's invention may be applicable to larger sized vehicles.

Located beneath each center travel platform 22 within a recess formed in floor 18 of each level, there is a rod 34 having reverse threaded ends. Fixedly secured adjacent the midpoint of the length of rod 34 is a drive gear 36 which is to cooperate with a pinion gear 38 of a motor 40. Motor 40 can be of any conventional type of motor, an electrically driven motor being preferable. Threadedly movable upon each end of rod 34 are a first nut 42 and a second nut 44. A first linkage arm 46 pivotally connects nut 42 and the nearest block 26 of center travel lane platform 22. A second linkage arm 48 pivotally connects nut 44 and the nearest block 26 of center travel lane platform 22. It is to be understood that a rod 34 is employed at each end of the platform 22 along with the aforementioned separate motors 40, gears 36 and 38, nuts 42 and 44, and linkage arms 46 and 48. The separate motors 40 are to operate simultaneously to maintain platform 22 substantially planar during vertical movement thereof.

Each of the first and second parking carriers 20 and 24 has attached on the undersurface thereof a pair of roller assemblies 50. Roller assemblies 50 provide for low frictional transverse movement of each of the carriers 20 and 24 with respect to floor 18. With the center travel platform 22 in the lowered position, the roller assemblies are free to move from floor 18 to the upper surface of platform 22. Aligned gaps 30 and 32 in the guides 26 are provided to permit the roller assemblies 50 to move upon the center travel platform unhindered by blocks 26.

Attached to floor 18 adjacent each side of the center travel lane, as shown in FIG. 5, there is a second motor 52 to rotate pinion gear 54. An idler gear 56 is rotatably mounted within bracket 58 with gear 56 being in operative contact with pinion gear 54 and a rack gear 60. Rack gear 60 is permanently attached to the fore-and-aft longitudinal sides of each of the first and second parking carriers 20 and 24, respectively. Upon rotation of pinion gear 54, through idler gear 56 and rack gear 60, each of the respective parking carriers 20 and 24 are moved transversely toward and away from the center travel lane 22. It is to be noted that motors 52, gears 54 and 56, and rack gear 60 are located at each longitudinal end of the side parking lanes and that the motors are operated selectively so as to move either carrier 20 or carrier 24 as required.

Located on the ceiling of each level 14 and 16 directly over the center travel lane 22 is a continuous chain operated pusher 62. The mechanism to operate such a pusher assembly is conventional and not shown in the drawings in detail. However, it is to be understood that a plurality of pushers 62 are employed which are capable of contacting the vehicles 28 and move the vehicles along the center travel lane on the line or row of platforms 22.

The operation of the apparatus of this invention is as follows: It will be presumed that the garage 10 is empty and it is desirous to park a plurality of vehicles 28. The carriers 20 of each section as in level 16 are located over the center travel lane with platforms 22 in the recessed or lowered position. It is also presumed that a series of levels 14 and 16 are employed longitudinally to form the garage. A vehicle 28 is moved upon the longitudinal row of carriers 20 in a position to be contacted by a pusher 62. The pusher 62 moves the vehicle 28 to the farthest empty parking location in the lane. Once the vehicle 28 is located within the proper section, the motors 52 are actuated and idler gear 56 through rack gear 60 causes movement transversely of the carrier 20 and vehicle 28 to its proper position upon floor 18 adjacent the center travel lane. Simultaneously to the storing movement of the first parking lane (shown on the left in the drawing), the other carrier 24 is moved transversely to the position over the center travel lane previously occupied by carrier 20. The pusher 62 places a second vehicle 28' upon the second carrier 24 and vehicle 28' is stored upon floor 18 to the right of the center travel lane.

With both the first and second parking lanes occupied for a given pair of left and right spaces, the motors 40 are actuated causing rotation of rods 34 which effect the raising of the center platform 22 to its upper position, as seen in level 14 of FIG. 1. With the most distant location filled, the procedure is repeated for the next to the farthest section and so forth until all sections are filled and the garage is full. By appropriate timing switches (not shown), the movement of a vehicle 28 to be parked always proceeds to the furthermost sections with an empty parking lane and no farther. With an entire section filled, the center travel lane remains open to permit selective removal of the vehicles 28.

When it is desirous to remove a specific vehicle, the motor 40 is actuated to lower a selected center platform 22 to the nonelevated or lower position. Then the motors 52 for that specific carrier 20 (or carrier 24) supporting the vehicle desired are actuated causing that specific carrier to move over the center travel lane. A pusher then contacts the vehicle 28 and moves it to the exit for the garage. The empty parking carrier remains in this position until the opposite parking carrier is demanded or until it is employed to store a newly entered vehicle.

By the above procedure, it is readily apparent that at all times except during locating and removing a vehicle, the center travel lane is open for the passing of a vehicle. Movement of vehicles right and left or on the travel lane is based on a standard time unit. It has been estimated that with a 5 second time limit, vehicles may move laterally into and out of a parking space.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A vehicle parking structure comprising:
a pair of elongated, parallel parking lanes separated by a travel lane adapted to rollably permit vehicular movement;
a plurality of laterally movable carriers disposed in said pair of parking lanes and individually being adapted to selectively reside in said travel lane; and
a plurality of vertically movable platforms disposed in said travel lane and adapted to move between a lower position to accommodate placement of said selected carrier thereover and a raised position so as to be flush with said adjacent carriers.

2. The invention as defined in claim 1 including
first means for selectively moving said platforms vertically;
second means for selectively effecting transverse movement of said carriers; and
third means for selectively moving vehicles through said travel lane.

3. The invention as defined in claim 2 wherein:
said second means includes low friction means located between each of said carriers and a fixed surface; and
said second means further including a motor driven gear assembly.

4. The invention as defined in claim 3 wherein:
said first means includes at least one motor, said motor effecting rotation of a rod, said rod being capable of moving a linkage assembly, said linkage assembly effecting movement of a selected platform between said lowered position and said raised position.

5. The invention as defined in claim 4 wherein:
said motor driven gear assembly includes a rear gear located on each of said carriers, a separate motor gear cooperating with each of said rack gears.

6. The invention as defined in claim 5 wherein:
said third means includes a pushing assembly for releasably engaging with a vehicle to move the vehicle along said travel lane.

7. The invention as defined in claim 1 wherein:
said carriers move in transverse alignment to the longitudinal travel of the vehicles along said travel lane; and
conveyor means are detachably engageable with the vehicle in said travel lane for moving the vehicle to a selected location between said parking lanes so as to be supported on a selected carrier disposed in said travel lane.